(No Model.)
J. C. J. C. FAVRE.
COIN CONTROLLED WEIGHING MACHINE.
No. 393,325. Patented Nov. 20, 1888.
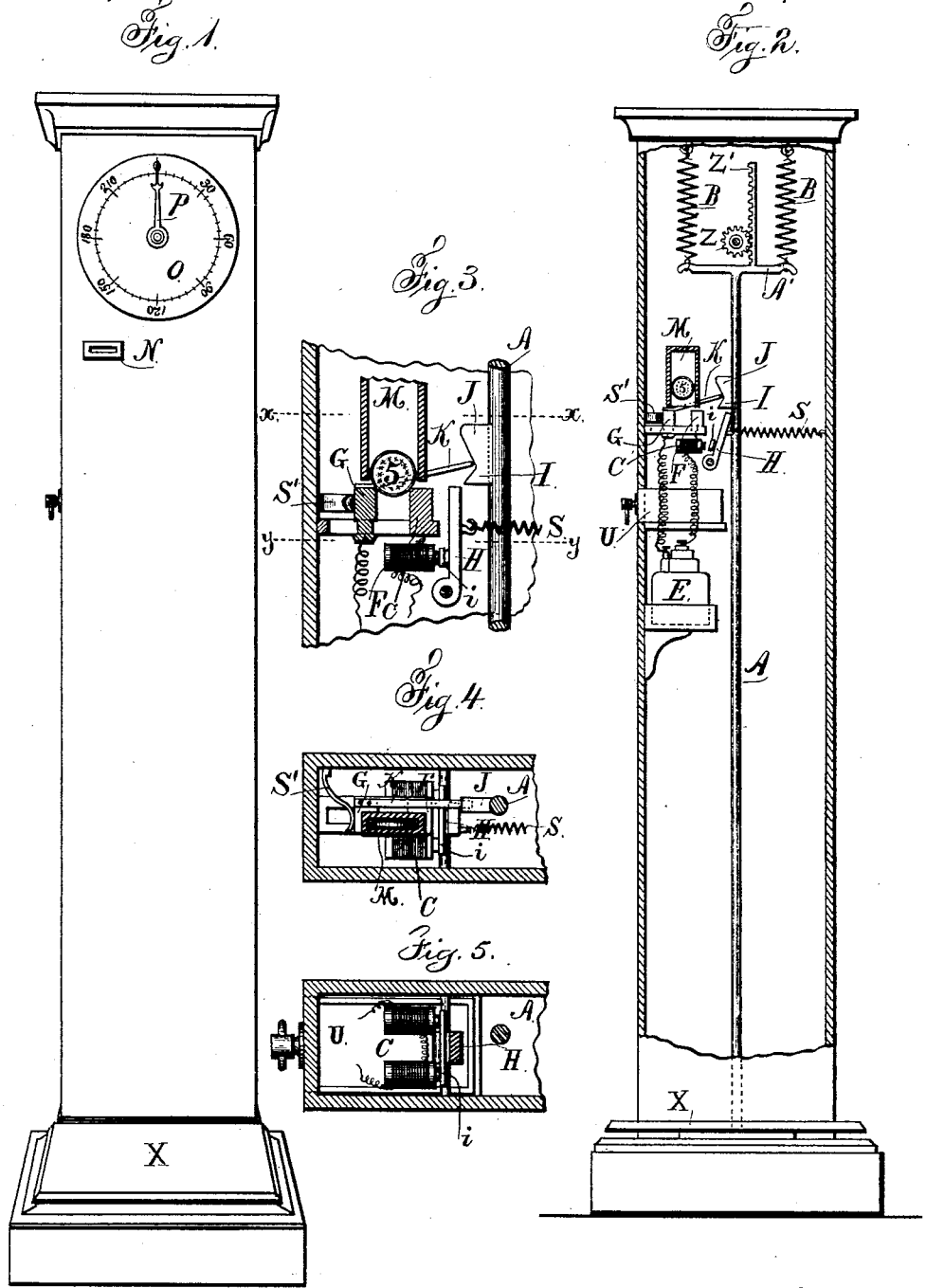
Witnesses:
H. A. McKean
A. M. Cave
Inventor:
per Jean Claudius Jules Cesar Favre.
Eaton & Lewis
Atty.

UNITED STATES PATENT OFFICE.

JEAN CLAUDIUS JULES CÉSAR FAVRE, OF MONTREAL, QUEBEC, CANADA.

COIN-CONTROLLED WEIGHING-MACHINE.

SPECIFICATION forming part of Letters Patent No. 393,325, dated November 20, 1888.

Application filed January 23, 1886. Serial No. 189,535. (No model.) Patented in Canada October 16, 1886, No. 25,147.

*To all whom it may concern:*

Be it known that I, JEAN CLAUDIUS JULES CÉSAR FAVRE, of the city of Montreal, in the district of Montreal and Province of Quebec, Canada, have invented certain new and useful Improvements in Weighing-Machines, (for which I have obtained Letters Patent from the Dominion of Canada, dated October 16, 1886, No. 25,147;) and I do hereby declare that the following is a full, clear, and exact description of the same.

The object of my invention is to produce a machine for weighing persons or other bodies which shall be operated only upon the payment of a prescribed fee by the introduction into the machine of a coin of predetermined denomination.

The main feature of my invention consists in the employment, in connection with weighing mechanism of ordinary or any suitable character, of a catch or locking device which normally locks such mechanism from operation, but which is adapted to release the same upon the introduction of the proper coin, whereby the weighing mechanism is permitted to weigh and indicate the weight of the body placed upon the machine. Another portion of my invention consists in the use of electrical devices for controlling or affecting the action of the machine, which are brought into operation by the closing of a circuit due to the introduction of the coin; and my invention further consists in the various novel devices and combinations of devices employed by me for carrying out the purposes of my invention in a simple and effective manner, as hereinafter set forth and claimed. I prefer to employ, in combination with the rod through which the weight of the body weighed operates the weight-indicating device, an electric battery, an electro-magnet in circuit therewith, and two circuit-terminals in the path of the introduced coin, so that the coin closes the circuit, whereupon said magnet attracts a pivoted spring-catch normally holding the rod from downward movement, whereby the rod is released and the use of the apparatus is permitted. After the weighing operation the parts return to their normal position and the rod is locked again, to be released only by the introduction of another coin, and means are provided whereby during the course of the operation the first coin is removed from its circuit-closing position and discharged into a receptacle provided for it.

In the drawings forming part of this specification, Figure 1 is a front elevation of the machine. Fig. 2 is an elevation of the apparatus with the front of the case removed. Fig. 3 is a partial vertical section in larger size of the coin-holder and adjacent parts. Fig. 4 is a sectional plan at the line $x\,x$; and Fig. 5 is a similar view at the line $y\,y$, Fig. 3.

Similar letters of reference indicate like parts.

X is the platform upon which the person stands, A A' being the connecting-rod through which the weight operates to cause the rod A to descend and overcome the resistance of the springs B B. The rack Z' descends with the rod A and rotates the gear-wheel Z, on the spindle of which is carried a needle, P, moving over the face of the figured dial O to indicate the number of pounds. The galvanic battery E has wires, one of which extends to and through the electro-magnet C and is connected to the electrode F. The other wire passes from the battery to the electrode G.

H is a pawl, which in its normal position is beneath a stop, I, upon the rod A, so as to prevent the latter from being drawn down by pressure on the platform X, and there may be a spring, S, to draw this pawl to its normal position. This pawl H has an armature, $i$, upon its face opposite the electro-magnet C.

N is an aperture in the case, through which the coin is introduced; and M, the conduit or the way down which it falls to the edges of the electrodes at G F.

The operation is as follows: The several parts being in the position shown in Fig. 2, the person wishing to be weighed, before mounting on the platform X, pushes through the hole N the coin required. This coin, falling upon the electrodes G F, at once completes the electric circuit from the battery E through the electro-magnet C and electrodes F and G, and the armature $i$ and pawl H are attracted, thus releasing the stop I and allowing the rod A A' to be drawn down by the weight on the platform X, and the hand or needle P, through the gear-wheel Z, is by this means moved so as to indicate on the dial O the number of pounds of weight standing or put on the platform X. As the rod A is moved downward in the before-named operation, the projection J on the rod A comes in contact with the arm K, one end of which arm is secured to the electrode G and slides or swings, so that the said electrode G is moved away from the electrode F and allows the coin to drop down between them into a drawer, U, or other suitable receptacle. After the passage of the coin a spring, S', returns the electrode G to its normal position. As soon as the electric circuit is broken by the fall of the coin the electro-magnet ceases to hold the armature of the pawl and the weak spring S swings the pawl back to its normal position against the rod A, thereby preventing the dial or scale or any part from being moved again until another coin is introduced, whereupon the operations are repeated. As soon as the rod A A' rises to its full height in the machine the pawl H resumes its position beneath the stop I and the electrode G is moved back into its position by a spring, S', which is strong enough to resist the weight of the coin. It will of course be understood that the distance between the electrodes G F is proportionate to the diameter of the coin required.

I claim as my invention—

1. In a weighing-machine, the combination of weighing mechanism and a locking device normally holding said mechanism from operation and adapted to release it upon the insertion of a coin into the machine, substantially as set forth.

2. In a weighing-machine, the combination of a platform, an indicator, a rod connecting them, and a catch normally holding said rod from movement and adapted to be withdrawn by the insertion of a coin into the machine, substantially as set forth.

3. In a weighing-machine, the combination of weighing mechanism and a spring-catch normally holding said mechanism from operation and adapted to release it upon the insertion of a coin into the machine and afterward to return to its original position, substantially as set forth.

4. In a weighing-machine, the combination of weighing mechanism, an indicator, a locking device, and an electro-magnet controlling said locking device in a circuit adapted to be closed by the insertion of a coin into the machine, substantially as set forth.

5. In a weighing-machine, the combination of weighing mechanism, an indicator, a locking device, and an electro-magnet controlling said locking device having terminals in the path of a coin inserted in the machine, substantially as set forth.

6. In a weighing-machine, the combination of a platform, an indicator, a rod connecting them, a catch normally holding said rod from movement, and an electro-magnet for withdrawing said catch in a circuit adapted to be closed by the insertion of a coin into the machine, substantially as set forth.

7. In a weighing-machine, the combination, with weighing mechanism and an indicator, of an electro-magnet controlling their operation in a circuit closed by the insertion of a coin into the machine, and means operated by the movement of the apparatus for discharging the coin and breaking such circuit, substantially as set forth.

8. In a weighing-machine, the combination, with weighing mechanism and an indicator, of an electro-magnet controlling their operation in a circuit having two terminals situated in the path of a coin inserted in the machine, and means operated by the movement of the apparatus for separating said terminals to discharge the coin, substantially as set forth.

9. In a weighing-machine, the combination of a platform, an indicator, a rod connecting them, a shoulder on said rod, a spring-pawl normally bearing beneath said shoulder, an electro-magnet for withdrawing said pawl, a circuit for said magnet having terminals situated in the path of a coin inserted in the machine, and means operated by the movement of the apparatus for separating said terminals to discharge the coin, substantially as set forth.

JEAN CLAUDIUS JULES CÉSAR FAVRE.

Witnesses:
OWEN N. EVANS,
ALEX. W. DOW.